(12) United States Patent
Wieland

(10) Patent No.: US 6,220,159 B1
(45) Date of Patent: Apr. 24, 2001

(54) CRANK MECHANISM FOR DISTRIBUTION CYLINDER IN A ROTARY PRESS

(75) Inventor: Rainer Wieland, Wüzburg (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 0 days.

(21) Appl. No.: 09/463,984

(22) PCT Filed: Aug. 13, 1998

(86) PCT No.: PCT/DE98/02331

§ 371 Date: Feb. 16, 2000

§ 102(e) Date: Feb. 16, 2000

(87) PCT Pub. No.: WO99/08873

PCT Pub. Date: Feb. 25, 1999

(30) Foreign Application Priority Data

Aug. 20, 1997 (DE) .............................. 197 36 118

(51) Int. Cl.⁷ .............. B41F 31/00; B41F 1/46; B41F 31/14; B41L 27/16
(52) U.S. Cl. .................. 101/349.1; 101/350.3; 101/352.06
(58) Field of Search ............... 101/350.3, 352.06, 101/348, 349.1, 205, 213; 74/15, 63, 25, 47, 48, 390; 384/255, 418, 419

(56) References Cited

U.S. PATENT DOCUMENTS

| 3,742,850 | 7/1973 | Sedlak . |
| 3,994,222 | * 11/1976 | Pullen .................................. 101/349 |
| 4,513,663 | * 4/1985 | Hummel et al. ...................... 101/349 |
| 4,711,173 | 12/1987 | Emrich et al. . |
| 5,158,019 | 10/1992 | Miescher et al. . |

FOREIGN PATENT DOCUMENTS

| 687918 | 1/1940 | (DE) . |
| 1151238 | 7/1963 | (DE) . |
| 1761389 | 6/1971 | (DE) . |
| 2710135 B2 | 6/1980 | (DE) . |
| 0189827 A2 | 6/1986 | (EP) . |
| 0480879 A1 | 10/1991 | (EP) . |

* cited by examiner

Primary Examiner—Kimberly Asher
(74) Attorney, Agent, or Firm—Jones, Tullar & Cooper, PC

(57) ABSTRACT

A crank mechanism for use in a rotary printing press is capable of varying the crank stroke length while the rotary printing press is operating. A rotatable eccentric journal and an eccentric bushing are shiftable with respect to each other. A helical groove and a cooperating pin are used to shift the eccentricities of the journal and the bushing to vary the effective stroke length of the crank mechanism.

3 Claims, 4 Drawing Sheets

CRANK MECHANISM FOR DISTRIBUTION CYLINDER IN A ROTARY PRESS

FIELD OF THE INVENTION

The present invention relates to a crank mechanism with a length-adjustable crank. Adjustment of the crank length or stroke is accomplished using two concentric, relatively rotatable eccentrics.

DESCRIPTION OF THE PRIOR ART

DE-OS 17 61 389 discloses a device for adjusting a friction cylinder stroke in an ink system of a rotary printing press. Here, a crank of the crank mechanism essentially consists of an eccentric pin and an eccentric bushing seated thereon. The eccentric bushing can be pivoted in relation to the pin by means of a planetary wheel gear.

DE 27 10 135 B2 describes a device for setting the angle of a distribution insert. Here, a phase position between a drive shaft with a helix-shaped groove, and a drive shaft is adjusted by means of a sliding bushing.

DE-PS 687 918 discloses a gear for converting a back-and-forth movement into a rotary movement.

DE-AS 11 51 238 discloses a fine feeding adjustment device. Here, a change in the length of the crank takes place directly via two non-twistable pins, which are supported on an obliquely extending, axially displaceable control surface.

Neither the pins nor the control surfaces can be displaced in the axial direction in respect to each other.

No adjustment by means of eccentric bushings and pins, which can be pivoted in respect to each other, is provided here.

EP 0 480 879 A1 discloses a device for the continuous adjustment of the axial distributing movement of a distribution roller. By this, an eccentric bolt is displaced by means of an axially displaceable gear wheel.

SUMMARY OF THE INVENTION

The object of the present invention is directed to providing a crank mechanism with a length-adjustable crank.

In accordance with the present invention, this object is attained by structuring the crank as two concentric, relatively rotatable eccentrics. A drive mechanism is used to shift the outer eccentric with respect to the inner eccentric on which it is supported. The inner eccentric is a journal that is eccentrically supported on a drive gear wheel. The outer eccentric is an eccentric sleeve. Relative rotation between the two varies the stroke length of the crank mechanism which they define.

The advantages which can be obtained by the present invention reside in particular, in that a crank mechanism with few, and easily produced components is created by the arrangement of an axially displaceable driving mechanism, for example a pin, with which a pivotable driving mechanism, for example a helix-shaped groove, works together. An effective length of the crank of the crank mechanism can be easily adjusted.

BRIEF DESCRIPTION OF THE DRAWINGS

Preferred embodiments of the present invention are represented in the drawings and will be described in greater detail in what follows.

Shown are in.

DESCRIPTION OF THE PREFERRED EMBODIMENTS

A crank mechanism for converting a rotary movement into a linear movement is used, for example, in a rotary printing press for driving oscillating distribution cylinders or doctor blade arrangements. In the preferred embodiments which follow, the crank mechanism is used for generating a stroke, in an axial direction of a distribution cylinder 3 for an inking system, or for a dampening system of a rotary printing press. The size of the stroke of the distribution cylinder 3 can be changed during the operation of the machine.

Figure 1:
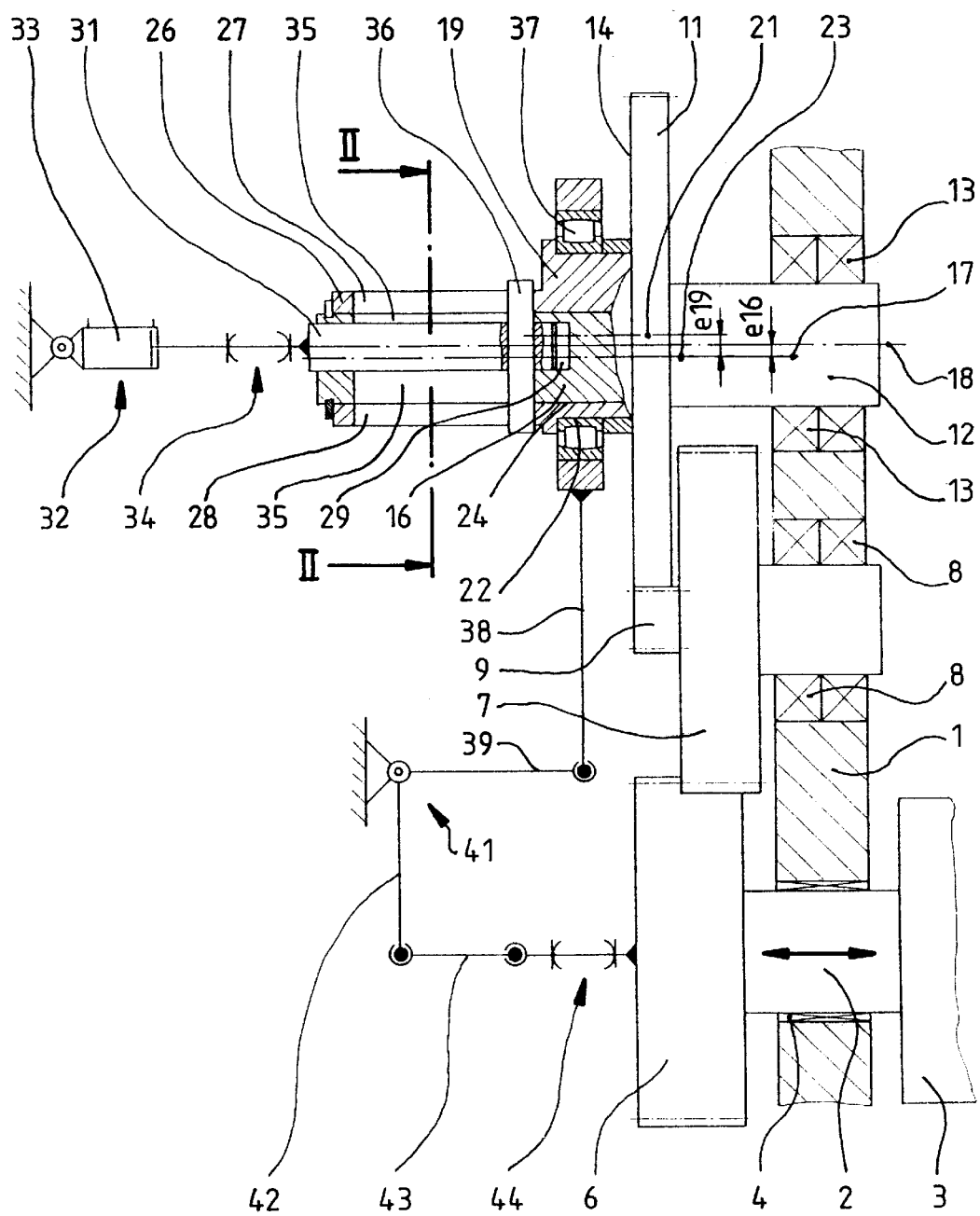
FIG. 1, a schematic representation of a crank mechanism in accordance with a first preferred embodiment, FIG. 2, a schematic section through a crank of the crank mechanism in accordance with FIG. 1, FIG. 3, a schematic representation of a crank mechanism in accordance with a second preferred embodiment, and in FIG. 4, a schematic section through a crank of the crank mechanism in accordance with FIG. 3.

A journal 2 of a distribution cylinder 3 is seated in a lateral frame 1 of a rotary printing press and is supported for rotation by roller bearings 4 and is movable in the axial direction, as seen in FIG. 1. A gear driven wheel 6 is fastened, in a torsion-proof manner, on this journal 2. This driven gear wheel 6 meshes with a first intermediate gear wheel 7, which is seated in the lateral frame 1 and is supported for rotation by a roller bearing 8. A second intermediate gear wheel 9 is fixedly connected with this first intermediate gear wheel 7. A drive gear wheel 11, which is seated in the lateral frame, is supported for rotation by a journal 12 and a roller bearing 13 and is fixedly seated in the axial direction of the journal 12. The drive gear wheel 11 engages this second intermediate gear wheel 9.

A journal 16 is eccentrically arranged on a front face 14 of the gear wheel 11, which faces away from the lateral frame 1. A center axis 17 of the journal 16 is eccentrically arranged, offset by an eccentricity e16, in respect to an axis of rotation 18 of the drive gear wheel 11, or respectively of the journal 12. An eccentric bushing 19 is pivotably seated on this journal 16. A center axis 21 of a surface 22 of eccentric bushing 19 is offset by an eccentricity e19 in respect to a center axis 23 of a bore 24 in the eccentric bushing 19. The center axis 23 of the bore 24 of the eccentric bushing 19 lies on the center axis 17 of the journal 16.

Figure 2:
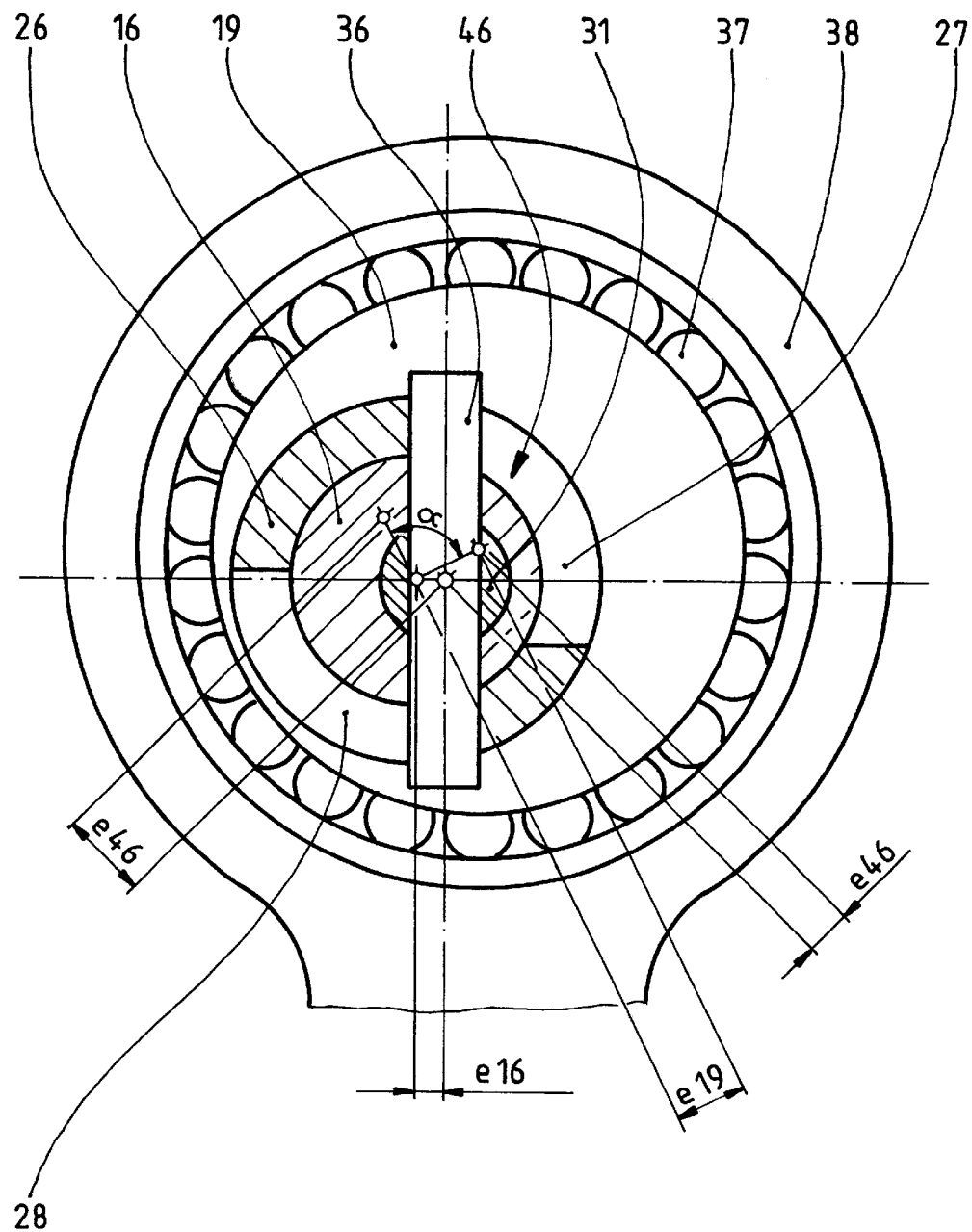

On its front face facing away from the lateral frame 1, the eccentric bushing 19 is provided with a sleeve 26, which extends axially away from the eccentric bushing 19 and which is centered with respect to the journal 16, as may be seen in FIGS. 1 and 2. This sleeve 26 has two grooves 27, 28, which are offset by 180° in respect to each other and which both extend in a helical manner along the axial length of sleeve 26.

An axially extending bore 29 is arranged in the journal 16, and extends concentrically in respect to the axis of rotation 18 of the drive gear wheel 11. A bolt 31, which is axially movable in relation to its longitudinal axis, is seated in this bore 29. This bolt 31 is connected with an actuating device 32 for the purpose of accomplishing movement of bolt 31 in the axial direction. In the first preferred embodiment, the actuating device 32 essentially consists of a work cylinder 33, arranged fixed in place on the frame, whose piston is connected with the bolt 31 by means of a first coupling 34. This first coupling 34 is rigid in the axial direction, and its two coupling halves are rotatable in respect to each other in the circumferential direction. For example, the actuating device 32 can also be designed as a positioning drive, so that the bolt 31 can be selectively positioned in a multitude of positions, for example by means of an electric motor.

A pin 36, which extends past the bolt 31 on both sides and which engages the bushing grooves 27, 28 on both sides of the bushing sleeve 26, is fastened in the bolt 31 in the radial direction and acts as a drive mechanism The journal 16 has two grooves 35, which extend parallel with the bolt 31 and which are used to prevent twisting between the journal 16 and the pin 36. The grooves 27, 28 and the pin 36 are matched to each other, so that the pin 36 is arranged movable in the axial direction along the grooves 27, 28 and has little play in the circumferential direction.

A spherical roller bearing 37 is fastened on the surface of the eccentric bushing 19. This spherical roller bearing 37 is arranged in a first coupler 38, which translates the rotary movement of the eccentric bushing 19, acting as a crank, into an oscillating linear movement. A free end of the first coupler 38 is hingedly connected with a first lever arm 39 of a two-armed lever 41. This lever 41 is pivotably seated in respect to the lateral frame 1. A second lever arm 42 of this two arm lever 41 is hingedly connected with a first end of a second coupler 43. A second end of this second coupler 43 is connected by means of a second coupling 44 with the journal 2 of the distribution cylinder. This second coupling 44 is rigid in the axial direction, and its coupling halves are rotatable in the circumferential direction.

The eccentric bushing 19, acting as part of a crank 46, drives the first coupler 38, so that the rotary movement of the journal 12 is converted, via the journal 16 and the eccentric bushing 19, which act as a coupler, into an oscillating linear movement of the first coupler 38. This oscillating movement is transferred to the distribution cylinder 3 by means of the two arm lever 41, the second coupler 43 and the coupling 44, so that the distribution cylinder 3 performs an oscillating movement in the axial direction.

In a first position of the eccentric bushing 19, in respect to the eccentrically arranged journal 16, their eccentricities e16 and e19 are superimposed on each other to form a first effective eccentricity e46 of the crank 46 constituted by the eccentric bushing 19 and by the journal 16.

To adjust the stroke of the distribution cylinder 2, the work cylinder 33 is actuated and the bolt 31 is axially moved from a first into a second position. In the course of this, movement of bolt 31, the pin 36 slides in an axial direction along the helical grooves 27, 28 and turns the bushing sleeve 26, and thus also the eccentric bushing 19 in accordance with a gradient of the grooves 27, 28 around an angle alpha, for example alpha=90° in the circumferential direction. The position of the eccentricity e19, for example e19–11.5 mm, of the eccentric bushing 19 in respect to the eccentricity e16, for example e16=5.4 mm, of the journal 16 is thus changed. From this change there results a second effective eccentricity e46' of the crank 46. In accordance with a ratio between the first effective eccentricity e46, for example e46=7.5 mm, and the second effective eccentricity e46', for example e46'=15 mm, the stroke h of the cylinder 3, for example h=15 mm, is increased to h'=30 mm The eccentricity e46, or respectively e46', corresponds to a length of the crank 46, i.e. the effective length of the crank 46 is therefore adjustable.

If a positioning drive is used in place of the work cylinder 33, a continuous stroke adjustment of the distribution cylinder 3 is also possible during the operation of the rotary printing press.

Figure 3:
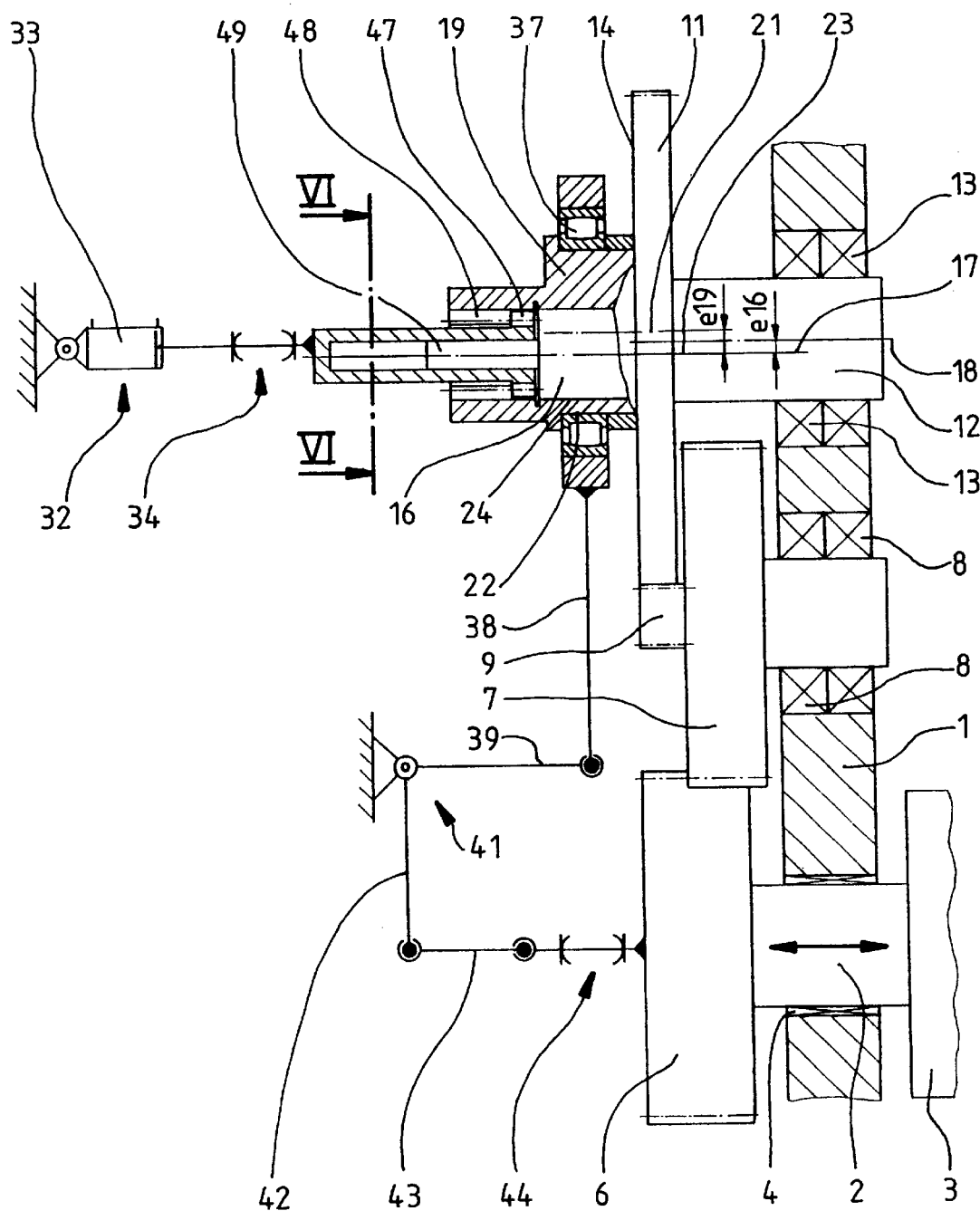
Figure 4:
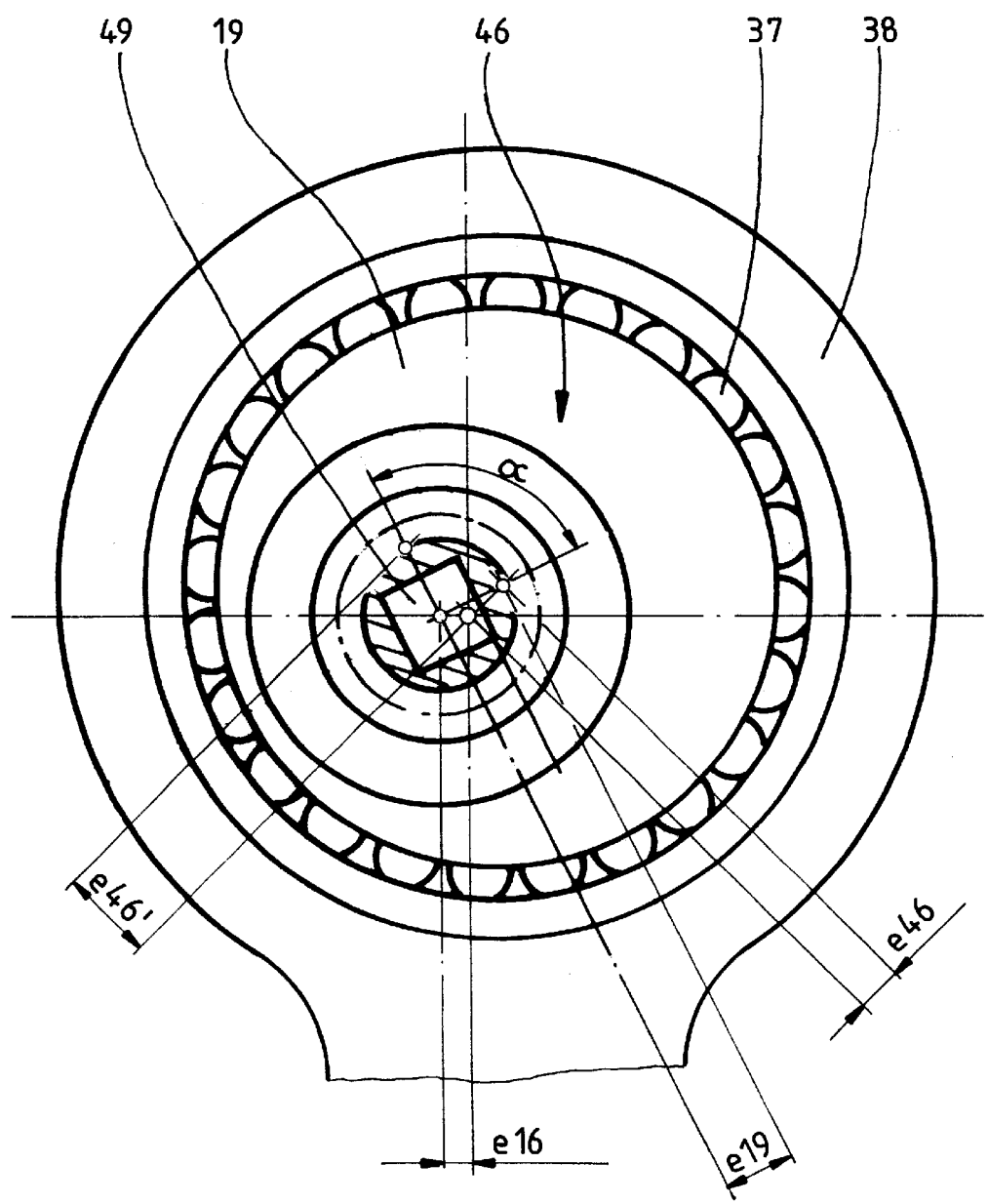

In a second preferred embodiment, as may be seen in FIGS. 3 and 4, a gear wheel 47, with helical exterior gearing, is provided as the driving mechanism, and a gear wheel 48 with helical interior gearing is provided as the power take-off mechanism. The gear wheel 47 with helical exterior gearing is seated, fixed against relative twisting, on the journal 16 by means of a square bolt, and is axially movable by means of the work cylinder 33. This gear wheel 47 with helical exterior gearing meshes with the gear wheel 48 with helical interior gearing, which is arranged at the eccentric bushing 19.

If the gear wheel 47 with helical exterior gearing is axially displaced, the gear wheel 48 with helical interior gearing is rotated, so that the position of the eccentric bushing 19, in relation to the journal 16, is changed.

The eccentric journal 16 and the eccentric bushing 19 of the crank mechanism 46 can be pivoted in respect to each other using either of the first and second embodiments. The driving mechanism 36 of the first embodiment or 47 of the second embodiment, which is movable in the axial direction of the axis of rotation 18 of the crank mechanism 46 and which is fixed in the circumferential direction in relation to the axis of rotation 18 of the crank mechanism 46, is arranged for adjusting the relative positions of the journal 16 and the eccentric bushing 19. This driving mechanism 36 of the first embodiment or 47 of the second embodiment is arranged so it works together with a driving mechanism 27 and 28 of the first embodiment or 48 of the second embodiment, which is fixed in the axial direction of the axis of rotation 18 of the crank mechanism 46, and is pivotable in relation to the circumferential direction of the axis of rotation 18 of the crank mechanism.

The eccentricities e16, e19 of the journal 16 and of the eccentric bushing 19 are adjusted to each other by the driving mechanism 36 of the first embodiment or 47 of the second embodiment being moved in the axial direction. The driving mechanism 27 and 28 of the first embodiment or 48 of the second embodiment, and therefore the eccentric bushing 19, are pivoted by this axial movement of the driving mechanism 36 of the first embodiment or 47 of the second embodiment. The size of the effective eccentric e46 of the crank 46 is changed by this.

It is also possible, in the first preferred embodiment, to arrange the helix-like grooves 27, 28 in the bolt 31, and the pin, or first embodiment driving mechanism 36 in the eccentric bushing 19. In this case, the prevention of twisting of the bolt 31 must not take place in accordance with the first preferred embodiment by means of the pin 36 or first embodiment driving mechanism, but instead, for example, by means of a square bolt 49 of the second preferred embodiment as seen in FIG. 2.

While preferred embodiments of a crank mechanism for use with a rotary printing press, in accordance with the present invention, have been set forth fully and completely hereinabove, it will be apparent to one of skill in the art that various changes in, for example, the drive for the gears, the specific type of press, and the like could be made without departing from the true spirit and scope of the present invention which is accordingly to be limited only by the following claims.

What is claimed is:

1. A crank mechanism adapted for use with a rotary printing press, said crank mechanism comprising:

a journal supported for rotation about an axis of rotation and having a journal eccentricity;

an eccentric bushing supported by, and rotatable with respect to said journal, said eccentric bushing having a bushing eccentricity, said journal eccentricity and said bushing eccentricity being shiftable with respect to each other;

a driving mechanism, said driving mechanism being shiftable in an axial direction of said axis of rotation, and being fixed in a circumferential direction of said axis of rotation; and a power take-off mechanism, said power take-off mechanism being fixed in said axial direction and being pivotable in said circumferential direction, said power take-off mechanism acting together with said driving mechanism, said driving mechanism being arranged to selectively act with one of said journal and said eccentric bushing, said power take-off mechanism being secured on said journal.

2. The crank mechanism of claim 1 wherein said driving mechanism includes a pin, said pin being axially shiftable with respect to said journal, and further wherein said power take-off is a helix-shaped groove in said eccentric bushing, said pin being receivable in said helix-shaped groove.

3. The crank mechanism of claim 1 wherein said crank mechanism is arranged to act with a distribution cylinder of the rotary printing press.

\* \* \* \* \*